United States Patent
Sinha et al.

(10) Patent No.: US 8,597,714 B1
(45) Date of Patent: Dec. 3, 2013

(54) NO SUGAR ADDED DRIED AND DESSERT FRUITS AND PROCESSES FOR PREPARING THE SAME

(75) Inventors: Nirmal K. Sinha, Frankfort, MI (US); Meena Sinha, Frankfort, MI (US)

(73) Assignee: Graceland Fruit, Inc., Frankfort, MI (US)

( * ) Notice: Subject to any disclaimer, the term of this patent is extended or adjusted under 35 U.S.C. 154(b) by 2070 days.

(21) Appl. No.: 11/378,225

(22) Filed: Mar. 17, 2006

Related U.S. Application Data

(60) Provisional application No. 60/662,727, filed on Mar. 17, 2005.

(51) Int. Cl.
*A23B 7/022* (2006.01)
*A23L 1/212* (2006.01)

(52) U.S. Cl.
CPC ............... *A23B 7/022* (2013.01); *A23L 1/2121* (2013.01); *A23L 1/2123* (2013.01)
USPC ...................................................... 426/640

(58) Field of Classification Search
CPC ... A23L 1/2121; A23L 1/2123; A23L 1/3081; A23B 7/02; A23B 7/022
USPC ...................................................... 426/640
See application file for complete search history.

(56) References Cited

U.S. PATENT DOCUMENTS

| | | | |
|---|---|---|---|
| 2,419,877 A * | 4/1947 | Birdseye | 426/541 |
| 2,424,870 A * | 7/1947 | Welling et al. | 426/302 |
| 3,952,112 A * | 4/1976 | Fulger et al. | 426/321 |
| 4,350,711 A * | 9/1982 | Kahn et al. | 426/102 |
| 4,952,414 A | 8/1990 | Kaufman et al. | |
| 5,227,182 A | 7/1993 | Song et al. | |
| 5,246,725 A | 9/1993 | Fisher et al. | |
| 5,270,071 A | 12/1993 | Sharp et al. | |
| 5,397,588 A | 3/1995 | Antenucci et al. | |
| 5,409,720 A | 4/1995 | Kent et al. | |
| 5,556,659 A | 9/1996 | De Pedro et al. | |
| 5,747,091 A | 5/1998 | Denhartog et al. | |
| 6,080,481 A | 6/2000 | Ochs et al. | |
| 6,143,786 A | 11/2000 | Gohman et al. | |
| 6,235,322 B1 | 5/2001 | Lederman | |
| 6,322,838 B1 | 11/2001 | Güntert et al. | |
| 6,419,911 B1 | 7/2002 | Bailey | |
| 6,569,477 B2 | 5/2003 | Lederman | |
| 7,118,772 B2 * | 10/2006 | Froseth et al. | 426/74 |
| 2002/0114868 A1 | 8/2002 | Lederman | |
| 2002/0150656 A1 | 10/2002 | Farnsworth et al. | |
| 2002/0188019 A1 | 12/2002 | Ley et al. | |
| 2003/0064104 A1 | 4/2003 | Stillman | |
| 2003/0068408 A1 | 4/2003 | Lederman | |
| 2003/0190395 A1 | 10/2003 | Vernon et al. | |
| 2003/0190396 A1 | 10/2003 | Merkel et al. | |

OTHER PUBLICATIONS

Frutex Pineapple syrup product specification, hereinafter Frutex, downloaded from the internet at http://www.nwnaturals.com/pds/frutexpineapplesyrup243801.pdf.*
Frutex Pineapple syrup product specification, hereinafter Frutex, downloaded from the internet, on Jan. 31, 2011,at http://www.nwnaturals.com/pds/frutexpineapplesyrup243801.pdf Document is undated.*
Camara, M.M., et al, Free Sugars determination by HPLC in pineapple products. Z. Lebesum Unters Fosch 202(1996) 233-237.*
Lyn O'Brien "Sweet Choices: Sugar Replacements for Foods and Beverages" *Food Technology*, vol. 56, No. 7, pp. 28-45 (Jul. 2002).
Sloan, Elizabeth A. "Top 10 Trends to Watch and Work On: 2003" *Food Technology*, vol. 57, No. 4, pp. 30-50 (Apr. 2003).
"Position of the American Dietetic Association: Use of Nutritive and Nonnutritive Sweeteners" *Journal of The American Dietetic Association*, vol. 104, No. 2, pp. 255-275 (Feb. 2004).

* cited by examiner

*Primary Examiner* — D Lawrence Tarazano
*Assistant Examiner* — Jerry W Anderson
(74) *Attorney, Agent, or Firm* — Mitchell Intellectual Property Law, PLLC

(57) ABSTRACT

One aspect of the present invention includes no sugar added dried and dessert fruits that do not contain added sugar, and moreover do not compromise the sweetness, flavor, color and texture properties of the dried and dessert fruits. Yet another aspect of the present invention includes a process for preparing no sugar added dried and dessert fruits that do not compromise the sweetness, flavor, color and texture properties of the dried and dessert fruits.

16 Claims, No Drawings

NO SUGAR ADDED DRIED AND DESSERT FRUITS AND PROCESSES FOR PREPARING THE SAME

CROSS-REFERENCE TO RELATED APPLICATIONS

This application claims priority to and the benefit of U.S. Provisional Patent Application Ser. No. 60/662,727, filed on Mar. 17, 2005, entitled NO SUGAR ADDED DRIED AND DESSERT FRUITS AND PROCESSES FOR PREPARING THE SAME by Nirmal K. Sinha et al., the disclosure of which is hereby incorporated by reference in its entirety.

BACKGROUND OF THE INVENTION

Sugar has been added to conventional dried and dessert fruits. The sugar softens the acidity of dried and frozen fruits such as tart cherries, cranberries and other dried and frozen fruits and improves the flavor profile and sensory acceptability of the fruits when consumed. In these conventional fruits, sugar minimizes some of the traditional defects experienced when dried and dessert fruits are prepared without sugar. These defects include shrinkage, a hard and leathery texture, a loss of color, a loss of juiciness and slow rehydration associated with these conventional dried and dessert fruits.

However, conventional dried and dessert fruits having sugar added thereto are not readily acceptable to people with health concerns such as diabetes and/or obesity. Similar to fat consumption, sugar consumption is emerging as a health issue because of concerns with, among other ailments and diseases, diabetes and obesity. The United States Food and Nutrition Board has recommended limiting intake of added/refined sugar to 25% or less of the total daily calorie intake.

Applicants have discovered no sugar added dried and dessert fruits, and processes for preparing the same that do not compromise the sweetness, flavor, color and texture properties when compared with sugar added dried and dessert fruits.

SUMMARY OF THE INVENTION

One aspect of the present invention includes dried and dessert fruits that do not contain added sugar and moreover do not compromise the sweetness, flavor, color and texture properties of the dried and dessert fruits.

Yet another aspect of the present invention includes a process for preparing no sugar added dried and dessert fruits that do not compromise the sweetness, flavor, color and texture properties of the dried and dessert fruits.

These and other features, advantages, and objects of the present invention will be further understood and appreciated by those skilled in the art by reference to the following specification and claims.

DETAILED DESCRIPTION OF PREFERRED EMBODIMENT

No sugar added dried and dessert fruits and methods for preparing the same are provided.

One embodiment of the present invention includes dried and dessert fruit prepared without any sugar added. This embodiment of the present invention generally includes use of an infusion mix that includes: water (typically in an amount of from about 40% to about 75% by weight of the mix, more preferably about 50% by weight of the mix); an artificial sweetener (typically in an amount of from about 0.01% to about 0.2%) such as sucralose that does not provide added calories; and one or more polyols such as sugar alcohols (sorbitol), erythritol polyols, glycerin, and mixtures thereof. The total amount of polyols may be up to about 50% of the infusion mix. However, when sorbitol is utilized, the amount of sorbitol is only up to about 20%.

There are at least four conventionally approved artificial sweeteners. These sweeteners include saccharin, aspartame (trade name NUTRASWEET®), aceslfame K (trade name SUNETT®) and sucralose (trade name SPLENDA®). Saccharin is approximately 300-500 times sweeter than sucrose (i.e., sugar), and is the oldest of these above-noted sweeteners. Saccharin is typically associated with a bitter taste and a metallic-like after-taste. Aspartame is approximately 180 times sweeter than sucrose, but has a tendency to breakdown at high temperatures (i.e., loses its sugar crystalline structure). Aceslfame K is approximately 200 times sweeter than sucrose. Aceslfame K is capable of withstanding higher temperatures without breaking down; however, it is associated with a bitter taste. Sucralose is approximately 600 times sweeter than sucrose, imparts zero calories, and does not have a bitter taste. It has superior chemical and biological stability as compared with the above-noted sweeteners in both dry mixtures and aqueous solutions. This allows sucralose to be used in both dry and aqueous preparations and for these reasons it is the preferred sweetener in the first embodiment of the present invention.

Process for Preparing Dried and Dessert Fruits Including Sucralose

An amount of sucralose was introduced in an aqueous solution to fruits. Sucralose (or other artificial sweetener) was introduced by holding fruits (fresh or frozen, whole or diced, with and without skin) prior to drying them in a preheated solution made of water, sorbitol and sucralose. The solution was preheated to a temperature of from about 70° F. to about 120° F. The sorbitol in the solution may be replaced with glycerin alone or may be used in combination with glycerin. The amount of sucralose in a solution is generally from about 0.01% to about 0.2%, more typically from about 0.05% to about 0.2% based on the weight of the fruit being dried. The fruit is held in the solution for up to approximately two hours. The fruit is then separated from the solution via any acceptable separating methods such as straining or sifting; however, straining is typically utilized. The fruit is then dried at a temperature of from about 120° F. to about 200° F. until the water activity of the fruit is less than approximately 0.60. The term "water activity" describes the amount of free or unbound water. A water activity of zero indicates a total absence of water molecules. A water activity of 0.80 indicates a moist product, a water activity of less than or equal to about 0.60 generally indicates a relatively dry product.

When sucralose was added in combination with polyols, the artificial sweetness apparent with the use of sucralose alone was eliminated. The color, texture, mouth feel and shelf life of the no sugar added dried fruits containing sucralose or other artificial sweetener were similar to the dried fruits containing added sugar.

The no sugar added dessert fruit was made by combining fruit with a syrup. The syrup typically includes water, polyols (i.e., glycerin) and sucralose (or other artificial sweetener), but may also include a sugar alcohol such as maltitol as the primary functional infusing component or the only component of the syrup. The sucralose was present in the syrup in an amount of from about 0.1% to about 0.20% based on the weight of the fruit mixed with the syrup. The fruit/syrup mixture was pasteurized at a temperature of from about 150° F. to about 190° F. with or without holding for a period of time of about five minutes. The pasteurized fruit/syrup mixture was cooled to from about 65° F. to about 80° F. The fruit may then optionally be separated from the fruit/syrup mixture, and then either the fruit or the fruit/syrup mixture may be frozen with or without adding additional sucralose (or other artificial sweetener) to the fruit or the fruit/syrup mixture.

In the above discussed no sugar added dried and dessert fruits, including sucralose, ascorbic acid and/or citric acid or another food acid may be added to improve the color and flavor of the dried and dessert fruits. Optionally, lemon juice concentrate may be a food acid added in place of ascorbic acid and citric acid to improve the color and flavor of the dried and dessert fruits. Additionally, the dried dessert fruits may also contain added colors, flavors, vitamins and minerals and/or other ingredients that do not contain substantial amounts of sucrose.

Examples 1-5 more precisely and particularly illustrate the specific details of this embodiment of the present invention. Equivalent procedures and quantities will occur to those skilled in the art and, therefore, Examples 1-5 are not meant to define the limits of this embodiment of the present invention. The no sugar added dried and dessert fruits of Examples 1-5 have a similar color, texture, mouth feel and shelf life as compared to dried and dessert fruits containing added sugar.

Example 1

No Sugar Added Dried Cranberries

Cranberries typically have a citric acid content of greater than 2% making them an extremely tart fruit. For most people, dried and dessert cranberries are unpalatable without having a sweetener added thereto. In the present example, no sugar added dried cranberries were made using the following ingredients: water (about 50% by weight of the non-fruit ingredients in Product A) (about 43.3% by weight of the non-fruit ingredients in Product B); sucralose, sorbitol (about 50% by weight of the non-fruit ingredients in Product A) (about 10% by weight of the non-fruit ingredients in Product B); and glycerin (about 46.7% by weight of the non-fruit ingredients in Product B) according to Table 1 below.

TABLE 1

| Ingredients | Product A (lbs) | Product B (lbs) |
|---|---|---|
| 1. Sliced cranberries | 4.0 | 4.0 |
| 2. Sucralose | 0.004 | 0.005 |
| 3. Sorbitol (70 °Brix) | 3.0 | 0.6 |
| 4. Glycerin (72 °Brix) | 0.0 | 2.8 |
| 5. Water | 3.0 | 2.6 |

Brix=percent soluble solids in water.

Throughout the remainder of the examples, IQF (Individually Quick Frozen) fruits were employed. IQF technology allows one to freeze individual pieces of fruit as opposed to block freezing several pieces of fruit. This allows a user to examine individual pieces of fruit for color, texture, mouth feel and shelf life. According to Example 1, IQF frozen sliced cranberries were placed in a stainless steel container at room temperature in solutions containing the following:

Product A—water, sorbitol and sucralose; and
Product B—water, sorbitol, glycerin and sucralose Each of the above-noted product solutions was heated to a temperature of from about 80° F. to about 120° F. before adding the cranberries. The cranberries were then added and held in the solution for a time period of from about 30 minutes to about 60 minutes. The cranberries were then separated from the solution and dried at a temperature of from about 130° F. to about 140° F. Any known drying technique may be utilized; however, drying with heated air is most typical. The cranberries are dried to a water activity of less than about 0.60, such as a water activity about 0.50 or less. The preferred moisture content after drying the cranberries is generally from about 8% to about 13%, such as about 10%.

The yields of the cranberries of Product A were not shriveled; however, their red color appeared somewhat bleached out. Upon rehydration with water the natural cranberry color was restored. The cranberries of Product B had a likable sweetness and the product was soft and free flowable and each exhibited the characteristic red cranberry color. Other less acidic fruits such as apples, blueberries, cherries, mangos, etc. may be made as described above. The level of sucralose can be reduced to as low as 0.01% (based on the weight of the fruit being dried) according to the sweetness level desired.

Example 2

No Sugar Added Dried Apples

Rome apples diced to ½ inch size pieces were placed in water (about 75% by weight of the non-fruit ingredients in Product C) with glycerin (about 25% by weight of the non-fruit ingredients in Product C) and sucralose (Product C) or a water and sucralose solution (Product D) for approximately 1 hour. This solution was heated to a temperature of about 80° F. Subsequently, the apples were separated from the respective solutions and dried at a temperature of about 140° F. for approximately 2 hours. The water activity and percentage moisture of the dried apples of Product C and Product D respectively were 0.28 and 5.1%, and 0.45 and 8.3%. The no sugar added dried apples include Product C and Product D as described in Table 2.

TABLE 2

| Ingredients | Product C (lbs) | Product D (lbs) |
|---|---|---|
| 1. ½" Diced, IQF Rome apple | 4.0 | 4.0 |
| 2. Sucralose | 0.002 | 0.002 |
| 3. Glycerin | 1.5 | 0.0 |
| 4. Water | 4.5 | 6.0 |
| 5. Ascorbic acid | 0.02 | 0.02 |
| 6. Citric acid | 0.01 | 0.01 |

The Product C apples made with glycerin and sucralose had superior texture and sensory properties. The Product D dried apples made without glycerin or other polyols were small and lacked the desired texture.

Example 3

No Sugar Added Dried Blueberries

Whole IQF wild blueberries were placed in water with glycerin and sucralose (Product E) or in water and sucralose (Product F) as shown in Table 3. The blueberries were held in each respective solution for approximately 1 hour at a temperature of about 80° F. Subsequently, the blueberries were removed from the solution and dried at a temperature of about 120° F. The water activity and percentage moisture of the dried blueberries of Products E and F was 0.45 and 13.2%, and 0.57 and 13.8%, respectively. The blueberries of Product E and Product F are described in more detail in Table 3 provided below.

TABLE 3

| Ingredients | Product E (lbs) | Product F (lbs) | Product G (lbs) |
| --- | --- | --- | --- |
| 1. IQF Whole wild blueberry | 4.0 | 4.0 | 10.0 |
| 2. Sucralose | 0.002 | 0.002 | 0.0 |
| 3. Glycerin | 1.5 | 0.0 | 0.0 |
| 4. Maltitol syrup (approx. 77 Brix) | 0.0 | 0.0 | 20.0 |
| 5. Water | 4.5 | 6.0 | 0.0 |

Both the blueberries of Product E and Product F had similar sensory properties. With blueberries, sucralose can be optionally incorporated directly into the blueberries without the use of polyols, such as glycerin. Product G shows the production of infused blueberries, but the following process may be used on other fruit such as apples, cranberries, strawberries, pineapple, mangos, peaches, and cherries. However, when the maltitol is used by itself as the infusion medium, the process is particularly effective when used in connection with blueberries, strawberries, and cherries. As noted above, other fruits may be infused using maltitol, but water is typically added to the infusion medium.

The blueberries of Product G were produced by holding the blueberries in maltitol syrup (about 90% as sweet as sucrose and provides only about 2.1 calories/gram (sugar is 4.0 calories per gram)). The blueberries, typically Individually Quick Frozen blueberries, are held in maltitol syrup typically at a temperature of about 90° F. to about 120° F., most typically at about 100° F. for at least about 5 hours (typically from about 5 to about 8 hours) to infuse the blueberries to at least about 45 Brix, more typically from about 45 Brix to about 50 Brix. Subsequently, the blueberries are removed from the maltitol syrup and dried, typically at a temperature of from about 160° F. to about 190° F., more typically at from about 165° F. to about 170° F. for from about 3 to about 5 hours, more typically for about 3 hours, which is typically until the water activity is about 0.6 $A_w$ or less (about 12% moisture or less). This product is low in calories and has a reduced glycemic response.

Example 4

No Sugar Added Dessert Maraschino Cherries

The no sugar added dessert maraschino cherries were made from brined sweet cherry halves. The brined sweet cherry halves were rinsed with water to obtain a sulfur content of less than about 50 ppm. The no sugar added dessert maraschino cherries were prepared using the ingredients of Table 4 as provided below.

TABLE 4

| Ingredients | Weight |
| --- | --- |
| 1. Rinsed brined sweet cherries | 2.0 lb |
| 2. Water | 3.0 lb |
| 3. Red # 40 | 0.01 lb |
| 4. Natural cherry flavor | 9.0 gram |
| 5. Citric acid | 9.0 gram |
| 7. Sucralose | 0.2 gram |

The rinsed cherries were placed in a water, color and sucralose solution as described in Table 4 for approximately 12-18 hours at room temperature. Subsequently, citric acid was added and the contents of the mixture were heated to a temperature of about 180° F. to about 190° F. The mixture was subsequently cooled. Once the temperature was below 90° F., flavor was added during the cooling phase. The sweetened, colored and flavored cherries were separated from the solution using a strainer and frozen and packed in plastic jars. The no sugar added dessert maraschino cherries, having sucralose added thereto, resulted in cherries having acceptable sensory properties.

Example 5

No Sugar Added Cherries

No sugar added cherries were made by thawing and weighing IQF sweet cherry halves and placing them in one pound plastic jars with sealable lids, which can withstand high temperatures under pressure. Up to 80% of the sweet cherry halves can be weighed in the jar and the remaining 20% is syrup containing glycerin (sorbitol and/or other polyols can be used in place of glycerin) (typically, the amount of glycerin (sorbitol) and/or other polyols are present in an amount of from about 18% to about 20%), pectins (typically in an amount of from about 0.5% to about 2% by weight of the syrup), sucralose (typically in an amount of from about 0.05% to about 0.2% by weight of the syrup), and citric acid (typically in an amount of from about 0.05% to about 0.5% by weight of the syrup). The pectin was pre-mixed with the sucralose and added to the pre-heated glycerin. The pre-heated glycerin is generally at a temperature of from about 100° F. to about 140° F. The pectins are mixed with the sucralose and the pre-heated glycerin to dissolve the pectins. Citric acid was later added to the mixture. The fruit and syrup matrix were seal-packed in the plastic jars and processed using water as an indirect heating and cooling medium at a temperature of from about 170° F. to about 180° F. The jars were held at this temperature for approximately five minutes and then cooled to a temperature of from about 65° F. to about 70° F. The no sugar added cherries were stored at a temperature of less than about 0° F. The cherries may be thawed to a semi-solid consistency and directly added to a frozen dessert such as ice cream or yogurt. The no sugar added cherries had acceptable sensory properties.

Another embodiment of the present invention includes dried and dessert fruits prepared without sugar added, which include one or more natural fruit juices as a sweetener. A low acid, generally less than about 0.5% acid by weight of the liquid, such as less than about 0.05% acid by weight of the liquid, or an acid free, colorless, and flavorless fruit juices such as pineapple syrup or chicory juice nectar are generally preferred.

Dried and Dessert Fruits Including a Low Acid, Colorless and Flavorless Juice Syrup Dried fruits were made by holding the fruits in low or no acid pineapple juice or chicory nectar. The low or no acid pineapple juice syrup generally contains about 0.05%, or less, more typically less than about 0.2% citric acid. The chicory nectar generally has a Brix content of from about 65-72. The Brix content is a measure of sugar solutions at specific temperatures which represents the percentage of weight of sugar in the solution. The low or no acid pineapple juice and chicory nectar are generally devoid of color, or they may have a slight off-white color, and are typically flavorless. The fruits are infused with low or no acid fruit juice or syrup(s) typically until they reach a Brix content of approximately from about 20 to about 40 Brix, more typically until they reach a Brix content of at least about 20 Brix or at least about 30 Brix, and most typically from about 30 to 55 Brix. For very highly acidic fruits such as cranberries, which have an acid content of greater than 2%, the cranberries are infused to a Brix content of from about 45 to about 55 Brix. For other fruits such as apples, strawberries, pineapples, blueberries, peaches, and mangos, the fruit is typically infused to a Brix of from about 30 to about 40 Brix. The fruits are subsequently separated from the pineapple syrup or chicory nectar and dried at a temperature of from about 120° F. to about 180° F. to a water activity of less than about 0.60.

The dessert fruits were made by combining the fruits with a low acid or no acid pineapple syrup content or chicory nectar and subsequently pasteurized. The fruit mixture was pasteurized at a temperature of from about 150° F. to about 190° F. with or without holding for a period of from about five minutes. The dessert fruits were then cooled to from about 65° F. to about 80° F. and subsequently frozen with or without low acid or no acid pineapple syrup or chicory nectar.

Examples 6-8 more precisely and particularly illustrate the specific details of this embodiment of the present invention. Equivalent procedures and quantities will occur to those skilled in the art and, therefore, Examples 6-8 are not meant to define the limits of this embodiment of the present invention, these being defined by the scope of the appended claims. The object of Examples 6-8 was to prepare no sugar added dried and dessert fruits including a low acid or no acid pineapple syrup or chicory nectar as a sweetener. The no sugar added dried and dessert fruits having the low acid or no acid pineapple syrup or chicory nectar added as sweetener that had a color, texture, mouth feel and shelf life that were similar to dried and dessert fruits containing added sugar.

Example 6

No Sugar Added Dried Fruits Including Low Acid Pineapple Syrup

Various fruits were placed in low acid pineapple syrup for a time period of from about 1 hour to about 5 hours until they attained a minimum Brix of approximately 30. The fruit was then separated from the pineapple syrup and dried at a temperature of approximately 165° F. until the fruit reached a water activity of about 0.45. After drying, the fruits were equilibrated at refrigeration temperatures for about 24 hours. Holding the fruit at these lower temperatures made the fruits, such as pineapple, strawberries and apples; more free flowable than if they were held at room temperatures. No sugar added dried fruits including low acid pineapple syrup include the ingredients listed in Table 6 below.

TABLE 6

| Fruit | Fruit Wt (lb) | Pineapple Juice (lb) | Water (lb) | Ascorbic Acid (gram) | Citric Acid (gram) |
|---|---|---|---|---|---|
| 1. Apple (½" diced, IQF, Rome variety) | 5.0 | 6.66 | 0.84 | 11.35 | 0.0 |
| 2. IQF, Red tart pitted cherry | 5.0 | 6.66 | 0.84 | 6.8 | 5.6 |
| 3. IQF, ⅜" diced yellow color pineapple | 5.0 | 6.10 | 1.30 | 11.35 | |
| 4. IQF whole strawberry, Senga-Segana variety | 5.0 | 6.66 | 0.84 | 6.8 | 5.6 |
| 5. Peach (½", IQF) | 5.0 | 6.66 | 0.84 | 6.8 | 6.8 |
| 6. Mango (3.8" diced, Kent variety) | 5.0 | 6.10 | 1.30 | 11.35 | 0.0 |

Juice concentrates such as chicory juice nectar, which has no acidity (and is also claimed to have a low glycemic index making it desirable for diabetics) can be used in place of or in combination with pineapple syrup.

Example 7

Frozen Dessert Fruit—Whole Strawberries without Sugar Added

Frozen dessert fruits, namely, whole strawberries without sugar added may be made with either a low acid fruit juice, a high acid fruit juice, or a combination of a low acid and a high acid fruit juice. This is not the case with dried fruits because the high acid fruit juices produce a stickiness characteristic with dried fruits. This is not an issue with frozen fruits. In this Example, colorless, flavorless and almost zero acid pineapple syrup was used to prepare no sugar added dessert type strawberries. Three pounds of whole strawberries were added to 4.5 pounds of a pineapple syrup having a Brix of about 70. This mixture was maintained at a temperature of about 80° F. until the strawberries reached a Brix of at least about 20. Thereafter, the contents were heated to approximately 150° F. and subsequently cooled to a temperature of about 80° F. The strawberries were separated from the pineapple syrup and subsequently frozen. The Brix and acidity of the juice containing strawberries was 32 and 0.64% respectively. The frozen dessert fruits—whole strawberries without added sugar had acceptable sensory properties.

Example 8

No Sugar Added Stabilized Strawberries

In this Example, modified starch and guar gum were mixed together. Optionally, pectins and other stabilizers like carrageenan can also be used in place of the starch and guar gum. The modified starch and guar gum mixture was then added to the pre-heated chicory nectar and mixed well until it dissolved. The pre-heated nectar was heated to a temperature of from about 100° F. to about 140° F. The ascorbic acid and citric acid were then mixed together and added to the chicory nectar mix. Subsequently, the chicory nectar mix was added to a plastic jar containing pre-weighed whole strawberries. The plastic jar had a sealable lid and was subjected to processing using water as an indirect heating and cooling medium at a temperature of from about 170° F. to about 180° F. with a zero to five minute hold time. This was then cooled to about 65° F. to about 70° F. The processed product was stored at a temperature of less than 0° F. Other frozen dessert fruits without sugar added may be made according to this Example. These types of dessert fruits are especially suitable for use in frozen desserts such as ice cream and/or yogurt.

In the foregoing description, it will be readily appreciated by those skilled in the art that modifications may be made to the invention without departing from the concepts disclosed herein. Such modifications are to be considered as included in the following claims, unless these claims by their language expressly state otherwise.

What is claimed is:

1. A process for preparing a dessert fruit comprising the steps of: adding water, a polyol selected from the group consisting of sorbitol, erythritol, glycerin and combinations thereof, pectin, a food acid, and an artificial sweetener selected from the group consisting of sucralose, saccharin, aspartame and acesulfame to a container, in amounts such that the infusion mixture comprises from about 10% to about 57% by weight polyol, from about 0.5% to about 2% by weight pectin, from about 0.05% to about 0.5% by weight food acid, from about 40% to about 75% water, and from about 0.01% to about 0.20% artificial sweetener by weight of the fruit to be infused;

mixing the water, the polyol, the pectin, the food acid, and the artificial sweetener to form an infusion mixture wherein the polyol is the primary infusing agent;

adding a fruit into the infusion mixture;

heating the infusion mixture with the fruit in the infusion mixture;

cooling the heated infusion mixture with the fruit in the infusion mixture; and separating the infused fruit from the infusion mixture.

2. The process of claim 1, wherein the artificial sweetener comprises sucralose and the sucralose is present in an amount of from about 0.05% to about 0.20% by weight of the fruit to be infused, the polyol is present in an amount of from about 18% to about 20% by weight of the infusion mixture.

3. The process of claim 1, wherein the polyol comprises sorbitol and the artificial sweetener comprises sucralose and is present in the infusion mixture in an amount of from about 0.01% to about 0.20% by weight of the fruit to be infused.

4. The process of claim 3, wherein the step of heating the infusion mixture comprises heating the infusion mixture to a temperature of from about 150° F. to about 190° F.; wherein the step of cooling the heated infusion mixture comprises cooling the heated infusion mixture to a temperature of from about 65° F. to about 80° F.; and wherein the step of separating the infused fruit comprises straining or sifting the infused fruit from the infusion mixture.

5. The process of claim 1 further comprising the step of holding the fruit in the infusion mixture for up to about two hours at a temperature of about 70° F. to about 120° F. and further comprises the step of adding an artificial sweetener comprising an artificial sweetener chosen from the group consisting of sucralose, saccharin, aspartame, and acesulfame K to the separated fruit and further comprises the step of freezing the infused fruit after adding the artificial sweetener.

6. A process for preparing a food product comprising the steps of:

providing a fruit and a low-acid syrup having a percent acid of less than about 0.05% by weight of the syrup, said syrup being selected from the group consisting of a pineapple syrup having a percent acid of less than about 0.05% by weight of the syrup, and a no acid pineapple syrup;

combining the fruit and the low-acid syrup;

holding the fruit in the low-acid syrup up to two hours until juice of the fruit reaches a Brix of from about 20 to about 55 Brix;

separating the increased Brix fruit from the low-acid syrup; and drying the increased Brix fruit to a water activity of less than about 0.60.

7. The process of claim 6, wherein the fruit is chosen, from the group consisting of skinless whole fruit, whole fruit with skin, diced fruit with skin, and diced fruit without skin and wherein the step of drying the increased Brix fruit comprises drying the increased Brix fruit at a temperature of from about 120° F. to about 180° F. to a water activity of less than about 0.60.

8. The process of claim 7, wherein the step of drying the increased Brix fruit comprises drying the increased Brix fruit until the increased Brix fruit reaches a water activity of about 0.45 or less; and wherein the fruit comprises a fruit chosen from the group consisting of cranberries, apples, blueberries, pineapples, strawberries, peaches, and mangos.

9. A process for preparing a dessert fruit comprising the steps of:

heating a syrup having an acid content of 0.5% or less by weight of the syrup, said syrup being selected from the group consisting of a pineapple syrup having a percent acid of less than about 0.05% by weight of the syrup, and a no acid pineapple syrup;

adding a stabilizer selected from the group consisting of pectin, carrageenan, a mixture of starch and guar gum, and combinations thereof;

mixing the stabilizer and heated syrup to form a mixture;

adding a food acid to the mixture to form a food acid containing mixture wherein the food acid is chosen from the group consisting of ascorbic acid, citric acid, lemon juice concentrate, and mixtures thereof;

adding a fruit to the food acid containing mixture;

indirectly heating the fruit and the food acid containing mixture to a temperature of from about 170° F. to about 180° F.;

indirectly cooling the fruit and the food acid containing mixture to a temperature of from about 65° F. to about 70° F.;

separating the fruit from the food acid containing mixture; and freezing the separated fruit.

10. The process of claim 9, wherein the indirect heating and cooling is done utilizing a water bath.

11. The process of claim 9, wherein the stabilizer is a mixture of a modified starch and guar gum; the fruit comprises a fruit chosen from the group consisting of cranberries, apples, blueberries, pineapples, strawberries, peaches, and mangos.

12. A dessert fruit made according to the process of claim 9.

13. A process for preparing a dessert fruit comprising the steps of:

heating a syrup having an acid content of 0.5% or less by weight of the syrup, said syrup consisting of chicory nectar;

adding a stabilizer selected from the group consisting of pectin, carrageenan, a mixture of starch and guar gum, and combinations thereof;

mixing the stabilizer and heated syrup to form a mixture;

adding a food acid to the mixture to form a food acid containing mixture wherein the food acid is chosen from the group consisting of ascorbic acid, citric acid, lemon juice concentrate, and mixtures thereof;

adding a fruit to the food acid containing mixture;

indirectly heating the fruit and the food acid containing mixture to a temperature of from about 170° F. to about 180° F.;

indirectly cooling the fruit and the food acid containing mixture to a temperature of from about 65° F. to about 70° F.;

separating the fruit from the food acid containing mixture; and freezing the separated fruit.

14. The process of claim 13, wherein the indirect heating and cooling is done utilizing a water bath.

15. The process of claim 13, wherein the stabilizer is a mixture of a modified starch and guar gum; the fruit comprises a fruit chosen from the group consisting of cranberries, apples, blueberries, pineapples, strawberries, peaches, and mangos.

16. A dessert fruit made according to the process of claim 13.

* * * * *